UNITED STATES PATENT OFFICE.

BENNO BORZYKOWSKI, OF CHARLOTTENBURG, GERMANY.

PRODUCTION OF ARTIFICIAL BRISTLES.

1,010,222.  Specification of Letters Patent.  Patented Nov. 28, 1911.

No Drawing.  Application filed February 18, 1911. Serial No. 609,531.

*To all whom it may concern:*

Be it known that I, BENNO BORZYKOWSKI, a subject of the Russian Emperor, residing at 1 Neukantstrasse, Charlottenburg, Berlin, in the German Empire, have invented certain new and useful Improvements in the Production of Artificial Bristles, of which the following is a specification.

This invention relates to the production of artificial bristles, designed to take the place of animal bristles, which are expensive and difficult to procure, and which are still generally employed in the manufacture of brushes, brooms, polishing wheels and the like.

My present invention relates to a new method of producing artificial bristles, the result being that bristles are obtained which can hardly be distinguished from animal bristles even by experienced brush makers, as their behavior when made up and in use and their appearance are demonstrated by practical experiments to be almost identical with animal bristles. Moreover, the artificial bristles are very much cheaper than the real bristles and of a beautiful white appearance, an appearance which it has been found impossible to obtain in the case of animal bristles even when the most costly processes of bleaching are employed.

The artificial bristles made according to my present invention are composed of cellulose derivatives with which are mixed, if desired, foreign substances or coloring materials, for instance gelatinous substances of animal origin, such as gelatin, albumen and the like.

In carrying out the invention I utilize plant cellulose, selected according to the desired quality of the bristles and the use to which they are to be applied. Suitable vegetable fibers are china grass (Ramie fiber) sawdust, and fibers of the cotton plant, cotton, flax, hemp, jute and the like, and also the seed pods and bark of different kinds of plants and trees. The cellulose is treated with acid such treatment being conducted either at a low or at a high temperature according to the nature of the fiber. For the treatment, any acids are useful which have a dissolving action upon vegetable cellulose, a single acid being in some cases used, in others a mixture of acids with or without other diluents. For instance sulfuric acid, acetic acid, nitric acid and the like are suitable. After treatment with the acid the vegetable cellulose is in the form of a soft and almost colorless mass. This mass can be colored in any desired manner by adding coloring materials. The soft mass is then placed in an apparatus of a known type by which it is pressed through holes or apertures into a chamber or vessel which is maintained at a suitable temperature, and which contains suitable liquids for causing the soft bristles to set as they emerge from the opening. Suitable liquids are water, alcohol, benzin or the like. In certain cases the viscous mass may be dropped into liquids such as those just mentioned, or into others having a like action, and the resulting product may be freed from the acid by means of water, treatment by steam or the like. It is then dried and can be afterward dissolved in suitable solvents such as chloroform, acetone, alcohol, a mixture of ether, alcohol and camphor, or their equivalents, again reducing it to a viscous mass which can be made into bristles in the above manner or in some other well-known manner. The article produced by the simple reaction first described or that produced by dropping the viscous mass into a liquid and afterward dissolving it, can also be utilized for making rigid or semi-rigid plates, blocks etc. by treatment with steam or otherwise. The plates, blocks or the like thus produced can be warmed and pressed by means of hydraulic presses through suitable devices provided with apertures of the required gage, thus obtaining bristles of any desired length. In other cases the rigid or semi-rigid blocks, plates or the like can have shavings or splinters removed from them by means of a suitable tool, which shavings or splinters constitute the bristles.

What I claim and desire to secure by Letters Patent of the United States of America is:—

A process for the production of artificial bristles consisting in dissolving vegetable fibers in an acid, dropping the viscous mass into a setting solution, drying the hardened mass and then obtaining shavings from the hardened mass for forming bristles, substantially as described.

In testimony whereof I affix my signature in presence of two witnesses.

BENNO BORZYKOWSKI.

Witnesses:
 WOLDEMAR HAUPT,
 HENRY HASPER.